US006915329B2

(12) United States Patent
Kriegsman

(10) Patent No.: US 6,915,329 B2
(45) Date of Patent: Jul. 5, 2005

(54) WEB SERVING SYSTEM

(75) Inventor: Mark E. Kriegsman, Boston, MA (US)

(73) Assignee: Xcelera (KN)

( * ) Notice: Subject to any disclaimer, the term of this patent is extended or adjusted under 35 U.S.C. 154(b) by 652 days.

(21) Appl. No.: 09/878,738

(22) Filed: Jun. 11, 2001

(65) Prior Publication Data

US 2001/0027480 A1 Oct. 4, 2001

Related U.S. Application Data

(63) Continuation of application No. 09/553,659, filed on Apr. 21, 2000, now Pat. No. 6,480,893, which is a continuation of application No. 09/396,323, filed on Sep. 15, 1999, now Pat. No. 6,370,580, which is a continuation of application No. 08/900,273, filed on Jul. 25, 1997, now Pat. No. 5,991,809
(60) Provisional application No. 60/022,598, filed on Jul. 25, 1996.

(51) Int. Cl.[7] .............................................. G06F 15/16
(52) U.S. Cl. ....................................... 709/203; 709/223
(58) Field of Search ................................. 709/203, 226, 709/229, 250, 238, 231, 232, 219; 718/105

(56) References Cited

U.S. PATENT DOCUMENTS

| 5,341,477 A | * | 8/1994 | Pitkin et al. ................. 709/226 |
|---|---|---|---|
| 5,371,852 A | | 12/1994 | Attanasio et al. |
| 5,434,994 A | | 7/1995 | Shaheen et al. |
| 5,459,837 A | * | 10/1995 | Caccavale ................... 709/226 |
| 5,475,819 A | | 12/1995 | Miller et al. |
| 5,499,386 A | | 3/1996 | Karlsson |
| 5,513,314 A | | 4/1996 | Kandasamy et al. |
| 5,539,621 A | | 7/1996 | Kikinis ....................... 361/803 |
| 5,572,643 A | | 11/1996 | Judson |
| 5,590,288 A | | 12/1996 | Castor et al. |
| 5,592,611 A | | 1/1997 | Midgely et al. |

(Continued)

FOREIGN PATENT DOCUMENTS

WO 95/08809 3/1995

OTHER PUBLICATIONS

Perrochon, "A Reference Architecture For Multi–Author World–Wide Web Servers" *Conference Organizational Computing Systems Milpitas, CA* pp. 197–205 (1995).
Bruno, "Web Servers Do What's Best for the Group", *Data Communications*, McGraw Hill, 25:29–30(1996).
European Search Report dated Mar. 13, 2002.

(Continued)

*Primary Examiner*—Zarni Maung
(74) *Attorney, Agent, or Firm*—Fish & Richardson P.C.

(57) ABSTRACT

The present invention is a collaborative server system for providing high speed data transmission of data files across a communications network which, in brief summary, comprises a communications network, a primary server having a primary communications component for connecting the primary server to the communications network, and at least one secondary server having a secondary communications component for connecting the secondary server to the communications network. The primary server and the at least one secondary server include storage component for storing data files. The data files include static data files and/or dynamic data files. The storage component of the primary server further stores at least one look-up table having specific criteria pertaining to the data files and the primary and at least one secondary servers. The processor component of the primary server is effective to receive a request for specific data files from a network user, to look-up specific criteria in the look-up table pertaining to the specific data files, and to allocate transmission of each specific data file between the primary server and the at least one secondary server based on the specific criteria.

4 Claims, 7 Drawing Sheets

U.S. PATENT DOCUMENTS

| | | | |
|---|---|---|---|
| 5,619,648 A | 4/1997 | Canale et al. | |
| 5,623,656 A | 4/1997 | Lyons | |
| 5,625,781 A | 4/1997 | Cline et al. | |
| 5,649,186 A | 7/1997 | Ferguson | |
| 5,659,729 A | 8/1997 | Nielson | |
| 5,666,362 A | 9/1997 | Chen et al. | |
| 5,671,279 A | 9/1997 | Elgamal | |
| 5,715,453 A | 2/1998 | Stewart | |
| 5,721,914 A | 2/1998 | DeVries | |
| 5,734,831 A | 3/1998 | Sanders | |
| 5,737,495 A | 4/1998 | Adams et al. | 395/615 |
| 5,742,762 A | 4/1998 | Scholl et al. | 395/200.3 |
| 5,774,660 A | 6/1998 | Brendell et al. | |
| 5,796,952 A | 8/1998 | Davis et al. | |
| 5,828,843 A * | 10/1998 | Grimm et al. | 709/228 |
| 5,828,847 A | 10/1998 | Gehr et al. | |
| 5,875,175 A | 2/1999 | Sherer et al. | 370/230 |
| 5,991,809 A | 11/1999 | Kriegsman | 709/226 |
| 6,044,205 A * | 3/2000 | Reed et al. | 709/201 |
| 6,128,660 A * | 10/2000 | Grimm et al. | 709/227 |
| 6,185,619 B1 * | 2/2001 | Joffe et al. | 709/229 |
| 6,266,335 B1 * | 7/2001 | Bhaskaran | 370/399 |
| 6,317,775 B1 * | 11/2001 | Coile et al. | 709/201 |
| 6,327,622 B1 * | 12/2001 | Jindal et al. | 709/228 |
| 6,360,262 B1 * | 3/2002 | Guenthner et al. | 709/226 |
| 6,477,522 B1 * | 11/2002 | Young | 707/2 |
| 6,480,893 B2 * | 11/2002 | Kriegsman | 709/226 |
| 6,505,254 B1 * | 1/2003 | Johnson et al. | 709/239 |

OTHER PUBLICATIONS

Crovella et al. "Dynamic Server Selection in the Internet", In Proc. of the Third IEEE Workshop on the Architecture and Implementation of High Performance Communication Subsystems (HPCS'95), Jun. 30, 1995, pp. 1–5.

Dias et al. "A Scalable and Highly Available Web Server", IBM Research Division, T.J. Watson Research Center, 8 pages.

Guyton et al. "Locating Nearby Copies of Replicated Internet Servers", university of Colorado at Boulder, Technical Report CU–CS–762–95 Department of Computer Science, Feb. 1995, pp. 1–18.

Korkea–aho, "Scalability in Distributed Multimedia Systems", Nov. 5, 1995, Helsinki University of Technology Laboratory of Information Processing Science, pp. 1–95.

Schemers, III, "Ibnamed: A Load Balancing Name Server in Perl", 1995 LISA IX–Sep. 17–22, 1995, Monterey, CA, pp. 1–11.

* cited by examiner

BLOCK DIAGRAM SHOWING COMPONENTS OF JAVELIN VT1 WEB SERVING SYSTEM

SUBROUTINE "DEMAND MO"

SUBROUTINE "REWRITE"

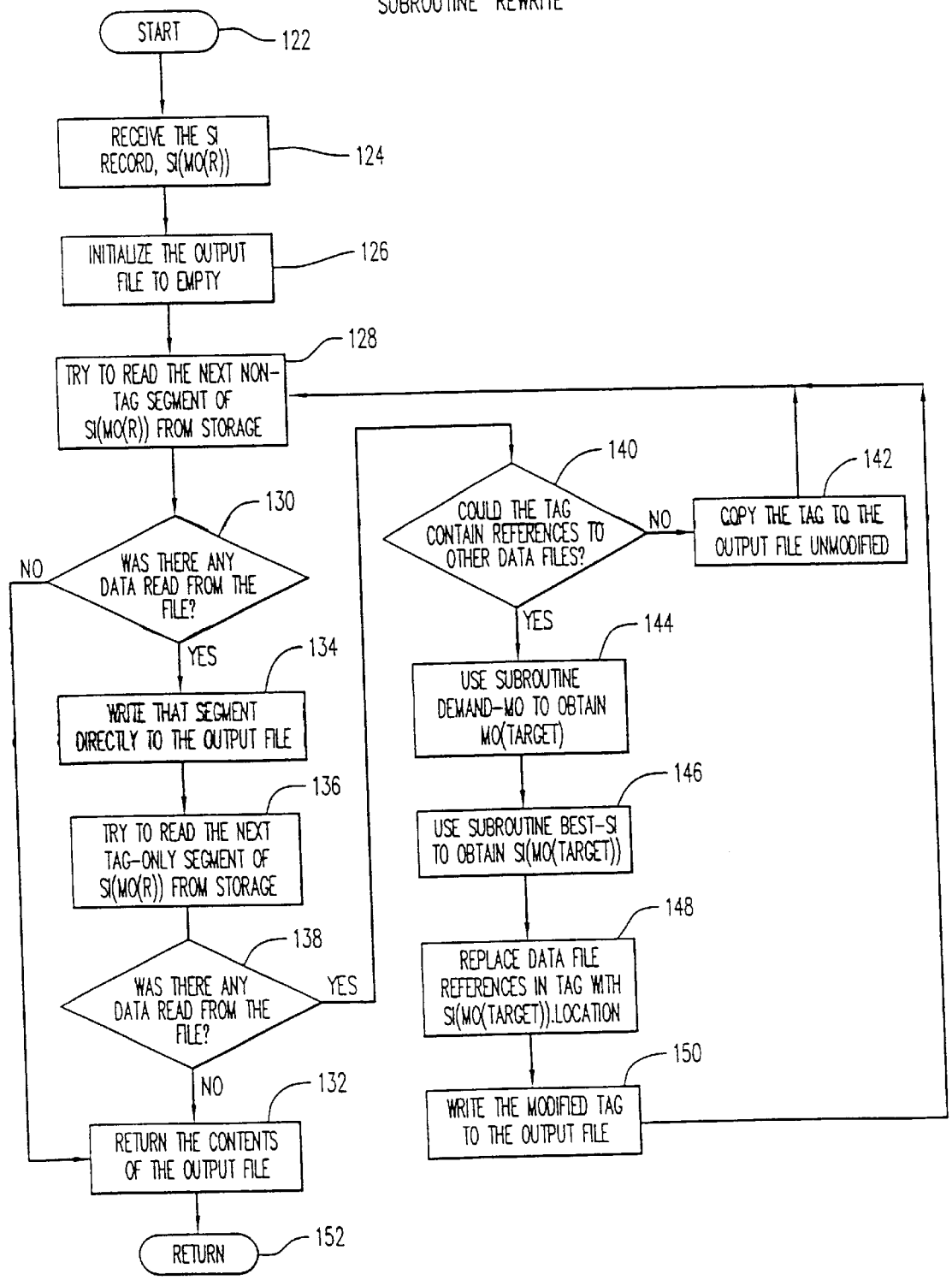

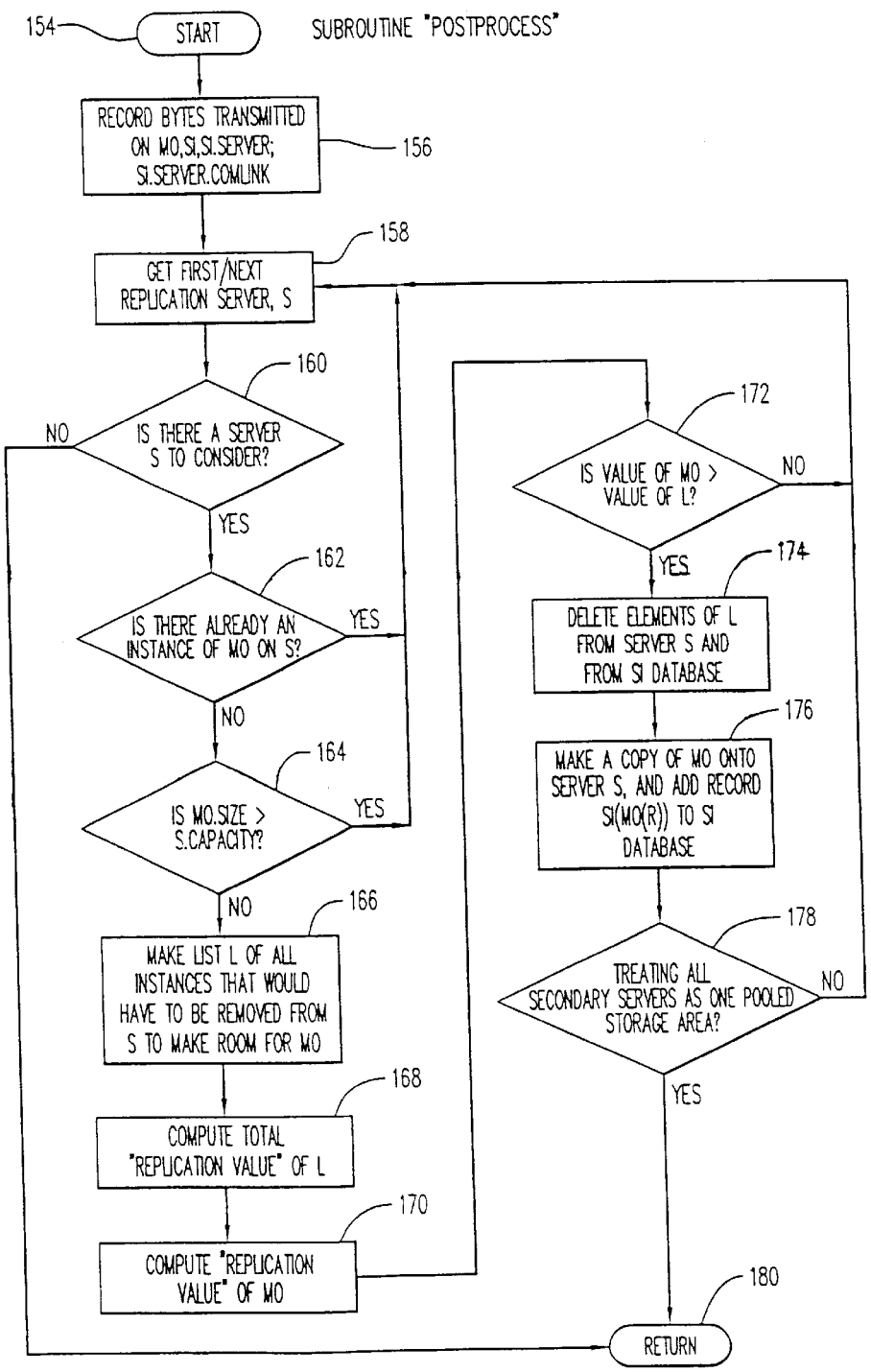

WEB SERVING SYSTEM

RELATED APPLICATIONS

This application is a continuation (and claims the benefit of priority under 35 USC 120) of U.S. patent application Ser. No. 09/553,659, filed on Apr. 21, 2000, which is now issued as U.S. Pat. No. 6,480,893, which is a continuation of U.S. patent application Ser. No. 09/396,323, filed on Sep. 15, 1999, which is now issued as U.S. Pat. No. 6,370,580, which is a continuation of U.S. patent application Ser. No. 08/900,273, filed on Jul. 25, 1997, which is now issued as U.S. Pat. No. 5,991,809, which claims the benefit of the priority date of U.S. Provisional Application 60/022,598, filed on Jul. 25, 1996. The disclosures of the prior applications are considered part of (and are incorporated by reference herein) the disclosure of this application.

The present invention relates generally to a network of computer systems that transfer data files through a network connection, some of which are repeatedly transferred without changes ("static files"), and some of which may be modified for each transfer ("dynamic files"). More particularly, the present invention relates to web servers that are connected to a TCP/IP-capable network and transfer data files of the World Wide Web to computer systems connected to the network. In particular, the present invention is a web serving system that efficiently coordinates the efforts of two or more web servers to transfer data files rapidly through the TCP/IP-capable network while minimizing the cost of such system.

BACKGROUND OF THE INVENTION

A web serving system or web server is a computer system that runs web server software and connects to a communications network, such as the Internet. A publisher may use the web serving system to offer various data files for public access, including text, graphics, audio, video, and other types of data files. Thus, anyone having a computer that is connected to the same network may retrieve these data files offered by the publisher through the use of a standardized communications protocol. One protocol, namely the Hyper Text Transfer Protocol ("HTTP"), is commonly used on TCP/IP-capable networks to transfer data files of the World Wide Web.

Data files of the World Wide Web are transferred from a web server to a web browser computer via a TCP/IP-capable network. The web browser computer typically consists of a computer, web browser software running on the computer, and communications hardware to connect the computer to the network through a communications link. Likewise, the web server typically consists of a computer, web server software running on the computer, storage hardware for storing the web pages, and communications hardware to connect the computer to the network through a communications link. A wide variety of communications links are available for connecting a computer to a TCP/IP-capable network, including an analog telephone connection, 56K line connection, ISDN connection, fractional T1 connection, Full T1 connection, cable-modem connection and satellite connection.

The user may view the contents of a specific data file of a particular web server by operating the web browser software. In particular, when a user wishes to receive the data file, the user operates the web browser computer so that it indicates the network address of the appropriate web server and the name of the data file on the server. The web browser computer then establishes a clear communications channel between the web server and itself, and requests the target data file. Next, the web server retrieves the specified data file from the web server's storage hardware and transmits the contents of the data file through the communications network to the web browser computer. The web browser computer then creates an audio/visual presentation of the data file for the user by activating the various hardware subsystems, such as one or more video monitors and/or audio speakers.

Web browser software has been enhanced to intermingle several pieces of text, graphics, video, audio, and animation together so that browsing or surfing the World Wide Web is an interactive and engaging process. In particular, standardized tags or sequences of text characters are included in the data files to control the placement of intermingled data files on the pages of the World Wide Web. A data file has text data and non-text data in which the standardized tags are included with the text data. The static data includes image data, animation data, video data, computer programs, and other types of non-text data. A data file containing a mixture of text and standardized tags is referred to as web page.

The standardized tags can include additional information, such as the web addresses, data file names of other web servers, and data files of graphic images, video clips, and audio recordings. Thus, most web browser software automatically presents an integrated display of dynamic data and embedded static data when displaying a webpage to the user. Accordingly, two distinct data files are retrieved to create a particular display: the first data file includes the text and tags, and the second data file includes the non-text data.

There are typically over a thousand web browsing users for every web server in operation and, thus, web servers are subjected to numerous requests for data files. Most contemporary web servers are capable of processing this volume of requests, but the web server's communications link quickly becomes saturated. In particular, any given communications link can only transmit a finite number of bits per second, and when a web server using all of the available bandwidth on its communications link to transmit data files, no more data files may be transmitted through that communications link until the transfers in progress are finished. Most communications links cannot sustain more than a dozen concurrent data file transfers, and each transfer can take several seconds.

Because of the high ratio of web browsers to web servers, it is extremely desirable to have a web server that is capable of handling at least ten concurrent data file transfers. Data communications technology, unfortunately, has not evolved as fast as other computer technologies. The least expensive type of communications link is the analog telephone line. However, the extremely constrained capacity of the analog telephone line makes it unacceptable for most web servers. The cost of other higher-speed communications links such as T1 lines increases along with their capacity, and they are far more expensive to setup and maintain than an analog or even ISDN telephone line.

On the other hand, because Full T1 lines are fairly cost effective, Internet Service Providers ("ISPs") have created profitable businesses by purchasing a Full T1 line, operating a web server, and renting out storage space to clients on their web server's storage hardware. These ISPs charge a low monthly rate for renting storage space on their web servers. Any data file that a client places in the rented storage space can be retrieved by web browsers that request them and, thus, clients make their pages and images accessible to a larger number of concurrent browsers without having to pay for the full cost of the full T1 themselves.

However, in order to maintain control and security of their web servers, the ISPs usually limit their clients to publishing static pages. Static pages are only stored and retrieved and, thus, dynamic and interactive pages are not permitted. Dynamic and interactive pages are essentially separate software programs that produce pages as their output. Since the software program is executed each time a web browser computer requests the page, the program may produce a different page each time, specifically for the web browser that made the request. This facility is becoming increasingly popular since it enables the interconnection of web server software and other software programs, such as databases, electronic commerce systems, e-mail systems, stock quote services, etc. Therefore, in order to have dynamic and interactive pages, a publisher cannot rent space from an ISP but must setup and maintain his or her own custom web server which is often prohibitively expensive.

Accordingly, the web serving system of the present invention has the capability of delivering text, graphics, video, audio and interactive multimedia over the Internet's World Wide Web at extremely high speeds, using only inexpensive, readily available hardware, software and services. The system requires no more effort than alternative systems, yet produces the highest performance-to-price ratio of any comparable World Wide Web publishing system.

SUMMARY OF THE INVENTION

The present invention is a collaborative server system capable of providing high speed data transmission of data files across a communications network which, in brief summary, comprises a communications network, a primary server having a primary communications means for connecting the primary server to the communications network, and at least one secondary server having a secondary communications means for connecting the secondary server to the communications network. The primary server and the at least one secondary server include means for storing data files and means for transmitting the data files to the communications network. The data files include static data files and/or dynamic data files. The storage means of the primary server further stores at least one look-up table having specific criteria pertaining to the data files and the primary and at least one secondary servers. The processor means of the primary server is effective to receive a request for specific data files from a network user, to look-up specific criteria in the look-up table pertaining to the specific data files, and to allocate transmission of each specific data file between the primary server and the at least one secondary server based on the specified criteria The storage means of the primary server includes static data files and dynamic data files, and the storage means of the secondary server includes a duplicate of the static data files. Thus, the processor means includes means for transferring the duplicate of the static data files from the storage means of the primary server to the storage means of the secondary server. Accordingly, the processor means of the primary server is capable of providing the dynamic files of the primary server and the duplicate of the static data files of either the primary server or the secondary server to the communications network in response to a single request for the static data files and dynamic data files of the primary server.

In addition, it is preferred that the secondary communications means of the secondary server transmits and receives communications signals to and from certain user's computers at faster rates, with lower latency, more cost-effectively, or more efficiently than that of the primary communications means of the primary server. In particular, the primary communications means of the primary server is a lower-cost connection to the communications network (i.e., an analog communication line), and the secondary communication means is a connection with better bandwidth, latency, cost-effectiveness, and efficiency (i.e., a digital T1 communication line).

Further, the system includes at least one computer system that is connected to the communications network and has the capability of sending a request to the primary server. In addition, the processor means of the primary server includes means for determining an optimum server from the group of servers including the primary and secondary server to transmit the duplicate of the static data files to the computer system when two or more servers are available. The criteria for determining which one of the servers shall transmit includes transmission speed and available capacity of the primary communications means, proximity of the computer system to each server, availability of each server, version of the duplicate of the data file on each server and financial cost of transmitting data from each server.

BRIEF DESCRIPTION OF THE DRAWINGS

The foregoing and still further objects and advantages of the present invention will be more apparent from the following detailed explanation of the preferred embodiments of the invention in connection with the accompanying drawings:

FIG. 6 is a preferred flow diagram of the REWRITE subroutine of FIG. 2; and

FIG. 7 is a flow diagram of the POSTPROCESS subroutine of FIG. 2.

DETAILED DESCRIPTION OF THE PREFERRED EMBODIMENT

Figure 1:
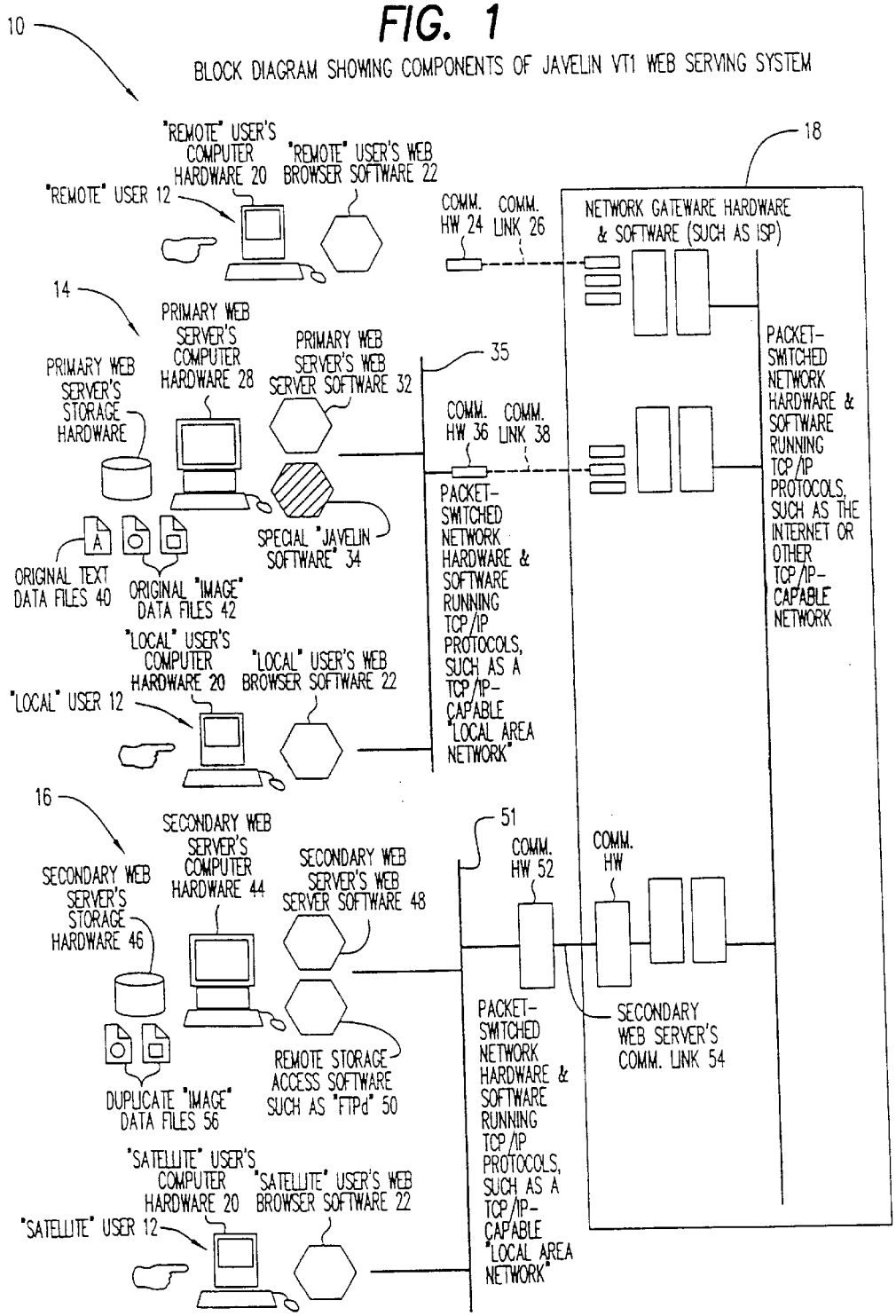
FIG. 1 is a diagrammatic view of the preferred web serving system in accordance with the present invention.

Referring to the drawings, and in particular, to FIG. 1, there is provided a web serving system of the preferred embodiment which is generally represented by reference numeral 10. Web serving system 10 has the capability of delivering text, graphics, audio recordings, video recordings, computer animation, and computer programs and data to remote computer systems and storage devices through a distributed data network at extremely high speeds, often in excess of 300,000 bits per second, in a way that is interoperable with the World Wide Web's hypertext protocol. In particular, web serving system 10 combines a low-cost communications channel of a primary server with a more desirable communications channel of one or more secondary servers as well as computer storage and retrieval services for both the low speed and high speed channels. By coordinating data retrieval from the various servers, the primary server is able to control the data files sent by each server so that the speed in which data files are delivered to a target browser computer is maximized while retaining the ability to provide dynamic and interactive pages (i.e., dynamic data files). In addition, the setup and maintenance costs of web serving system 10 are substantially less than that of conventional web serving systems since its secondary web server takes advantage of the low cost of renting or otherwise using storage space in existing servers and its primary web server takes advantage of lower-cost, lower-bandwidth communications links including analog telephone lines and lower-speed digital connections.

When used with an analog telephone line, preferred web serving system 10 shown in FIG. 1 is capable of fulfilling requests for over 100,000 data files per day at a minimal cost. The available capacity of the system is dependent on a number of factors and conditions, but the system can reliably sustain performance in the 400 Kbps range and process many transfers concurrently. Also, the monthly cost per concurrent connection is much lower than that of a conventional web serving system that uses a 56K line connection, ISDN connection, fractional T1 connection, or Full T1 connection.

As shown in FIG. 1, preferred web serving system 10 includes one or more web browser computer systems 12, a primary web server 14 and one or more local web browser computer system 15 connected on a local area network (LAN) 35, one or more secondary web servers 16 and one or more satellite web browser computer system 15 connected on a LAN 51, and a communications network 18. Web browser computer system 12 may be a web user connected on a local area network (LAN) 35 with primary web server 14 (local user), connected on a LAN 51 with secondary web server 16 (satellite user) or not connected to either LAN 35 or LAN 51 (remote user).

Each web browser computer system 12 includes a users computer 20, web browser software 22 residing in computer 20, communications hardware 24 connected to computer 20, and communications link 26 connecting communications hardware 24 to communications network 18. In particular, user's computer 20 may be any type of computer system that is capable of running user's web browser software 22 and connecting to communications network 18. For example, user's computer 20 may be a personal computer or workstation that includes a memory portion for storing user's web browser software 22 and a processor for executing web browser software 22 so that the user may interact with software 22. Also, user's computer 20 is connected to user's communications hardware 24 which, in turn, is linked to communications network 18 by user's communications link 26. For example, a modem may be used to link user's computer 20 to an Internet Service Provider ("ISP") through a telephone line. Since a wide variety of different computer systems may connect to the network, it is to be understood that user's computer 20 of the present invention is not limited to the personal computer or workstation examples described above. Note that web browser computer systems 12 which are connected to either LAN 35 or LAN 51 respectively employ the same communications hardware and link as primary server system 14 and secondary server system 16.

Primary web server 14 includes a primary computer 28, storage hardware 30 connected to computer 28, web server software 32 and supplemental web server software 34 residing in computer 28, communications hardware 36 connected to computer 28, and communications link 38 providing a connection between communications hardware 36 and communications network 18. Also, primary storage hardware 30 may reside internal or external to primary computer 28 and is capable of storing primary data files, such as original dynamic data files 40 and original static data files 42. Dynamic data files 40 include standardized tags as well as text data, whereas static data files 42 typically include non-text data, such as image data, animation data, video data, audio data, and computer programs. Primary data files (40, 42) are commonly transmitted over packet-switched communications network 18 using TCP/IP protocols and read by user's web browser software 22. Primary computer 28 may be any type of computer system that is capable of running primary web server software 32 and supplemental web server software 34, and connecting to communications network 18. A wide variety of computer systems, ranging from mainframe computer to personal computers, are capable of running web server software 32 with supplemental web server software 34 and, thus, primary computer 28 is affordable and readily available. For example, primary computer 28 may be a personal computer or workstation that includes a memory portion for storing primary web server software 32 and supplemental web server software 34, and a processor for executing both software. Also, similar to web browser computer system 12, primary computer 28 is connected to primary communications hardware 36 which, in turn, is linked to communications network 18 by primary communications link 38.

In addition, the present invention includes one or more secondary web servers 16. Although a secondary web server 16 may be purchased and setup for the present invention, the services of such secondary web server 16 is readily available to avoid their high setup and maintenance costs, which is a feature of the present invention. For example, one may rent space on a secondary web server from an Internet Service Provider for a low fee, or arrange to use space on a secondary web server owned by an organization or university.

Typically, each secondary web server 16 includes a secondary computer 44, storage hardware 46 connected external or provided internal to secondary computer 44, web server software 48 and remote storage access software 50 residing in secondary computer 44, communications hardware 52 connected to secondary computer 44, and communications link 54 connecting secondary computer 44 to communications network 18. Secondary storage hardware 46 is capable of storing data files 56 that are duplicates of the original data files (40, 42) in primary storage hardware 30 of primary web server 14. Also, secondary communications link 54 has superior operating characteristics than that of primary communications link 38. For example, as shown in FIG. 1, secondary communications link 54 is a Full T1 line that has higher performance capacity than primary communications link 38 which is an analog telephone line. Also, similar to primary computer 28, secondary computer 44 may be any type of computer system, ranging from personal computer to mainframe computers, that is capable of running secondary web server software 48 and remote storage access software 50, and connecting to communications network 18. Further secondary computer 44 is connected to secondary communications hardware 52 which, in turn, is linked to communications network 18 by secondary communications link 54.

Computer 28 of the primary web server 14 executes supplemental web server software 34 to perform the critical function of coordinating file transfers by primary web server 14 and secondary web server or servers 16. Computer 28 and supplemental web server software 34 exploit the fact that the ultimate audience, namely the users who accessing primary web server 14, for data files (40, 42) is not involved in the retrieval of each data file individually In actuality, the task of retrieving data files, particularly static data files 42 that are embedded in pages, is performed automatically by the user's web browser software, such as web browser software 22.

Primary computer 28, when used with supplemental web server software 34, adds significant and powerful capabilities to primary web server software 32. In particular, primary computer 28 identifies the static files (i.e., typically non-text data files) that are consuming most of the capacity of primary communications link 38, copies those capacity-consuming static data files 42 to one or more secondary web servers 16 (which have higher capacity communications links), and then dynamically re-writes requested pages so that the embedded static data files are retrieved directly from the best or optimal web server each time. Primary computer 28 also records every request for a data file (40, 42), builds a statistical model of how the capacity of primary communications link 38 is being consumed by the transmission of the various data files (40, 42), determines which static data files 42 are consuming the most capacity, uses standardized communication protocols to communicate through the channel between primary and secondary web servers (14, 16), uses the communication channel to copy static data files 42 from primary storage hardware 30 to secondary storage hardware 46, and tracks the progress and location of all duplicated files 56 through the use of a database.

In addition, primary computer 28 responds to requests for pages stored on the primary storage hardware 30 by reading the data file (40, 42) from the primary storage hardware 30, finding all tags in the data file (40, 42) that refer to static data files 42 stored on primary web server 14, examining the database to retrieve a list of secondary web servers 16 and data files 56 where instantiation of static data file 56 referred to by each tag may be found. Primary computer 28 also responds to requests for pages stored on primary storage hardware 30 by determining, for each static data file 42 referred to by the page's tags, which available instantiation would be the best instantiation to transmit to web browser computer system 12. Considerations for determining the best instantiation includes the transmission speed of each web server's communications link (38, 54), the currently available capacity of each web server's communications link (38, 54), the proximity of web browser computer system 12 to each web server (14, 16) given the topology of the communications network 18, the current availability or operability of each secondary web server 16, the version of the data file 42 available on each web server (14, 16) in which only instantiations that are current are eligible, the cost of transmitting the data file from each server, the response latency of each server with respect to the requesting computer and the efficiency of transmitting the data file from each server. Primary computer 28 further responds to requests for pages stored on the primary storage hardware 30 by creating a re-written page, in which each tag that refers to a particular data file 42 is replaced with a tag that is functionally identical except that the tag now refers to the best instantiation rather than to original data file 42. Also, the re-written page is transmitted through the primary connections link to web browser computer system 12, statistical information about the transmission of the page and the supposed transmission of any static data file 42 whose best instantiation is not on primary web server 14 is recorded, various statistics are used to update the database with revised information about the usage levels and patterns of data files (40, 42, 56) on both primary web server 14 and secondary web servers 16, and statistical information in the database is used to guide primary computer 28 in optimizing of the distribution of data file instantiations across multiple servers.

Once static data files 42 have been copied to one or more secondary web servers 16, only original dynamic data files 40, particularly their text-and-tags information, need to be transferred through primary communications link 38. Most static data files 56 that are requested from outside the local area network are transmitted over the higher-speed, higher-capacity, lower-latency or more efficient links of secondary communications hardware 52. If one secondary web server 16, whose communications link 54 is a Full T1 line, is used, the speed at which the primary computer 28 can deliver pages and static data files can be as high as about 1200 Kbps for short bursts and tends to run consistently about 300 Kbps to about 400 Kbps. Thus, by combining the resources of a low-cost, low-bandwidth communications link 38 and some low-cost storage space on one or more secondary web servers 16 with high speed, high capacity communications links 54, the result is a web serving system which is fast, interactive and inexpensive.

It is important to note that the present invention provides high capacity performance, reliably sustaining about 400 Kilobits per second of capacity, while providing the capability of handling dynamic and interactive pages and benefiting from the economical startup and maintenance costs of a low cost, low bandwidth communications link. In particular, when used with an analog telephone line, the present invention is capable of delivering performance that is comparable to a system having a fractional T1 connection and surpasses a system having 56K line or ISDN connection. Therefore, for the present invention, an expensive digital communications link, such as fractional T1 connection or Full T1 connection, is not required for high capacity performance. In fact, the primary communications link may be an analog telephone line connected to the primary communications hardware, such as a modem, and yet provide performance that is comparable to a fractional T1 connection and outperform a 56K line or ISDN connection.

Figure 2:
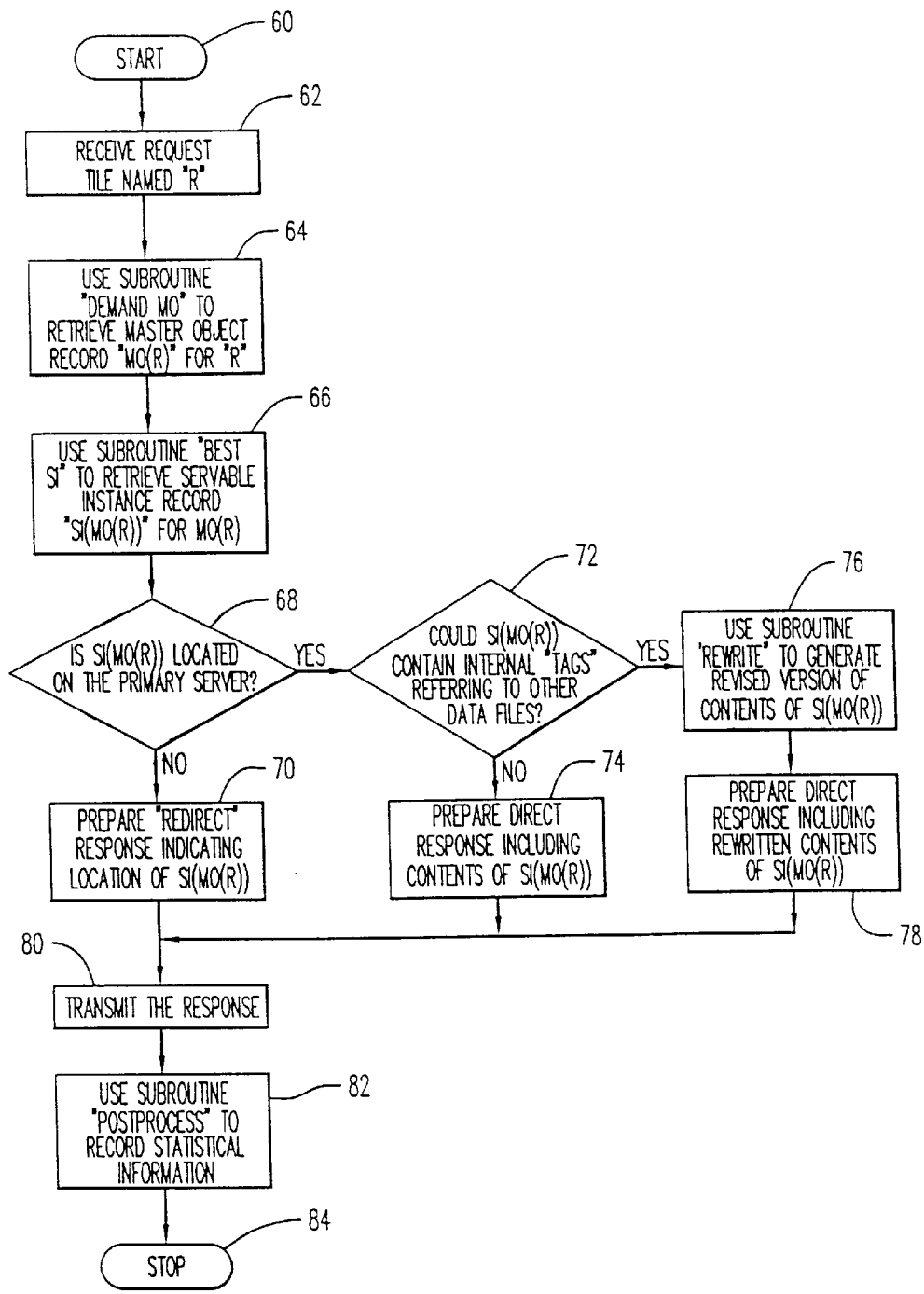
FIG. 2. is a flow diagram representing the operation of the primary web server's computer when used with the supplemental web server software of FIG. 1.

Referring to FIG. 2, there is provided the main flow chart, beginning with step 60, for the process performed by primary computer 28, when using supplemental web server software 34, for coordinating the file transfer functions of primary web server 14 and secondary web server or servers 16. When a new request for a data file (40, 42) is received by web server software 32 as shown in step 62, primary computer 28 starts by examining the name of the requested file as using subroutine DEMAND MO shown in step 64. The coordinating means then selects the instance with the highest quality that is associated with this master object by using subroutine BEST SI as shown in step 66.

If the best instance is not associated with the primary server, then a redirect response indicating the location of the instance master object is prepared as shown in steps 68 and 70. If the best instance is associated with the primary server but the requested data file is not a page that may contain tags or reference to other data files, a direct response including the contents of the instance master object is prepared as shown in steps 72 and 74. If the best instance is associated with the primary server and the requested data file contains tags or reference to other data files, then a revised version of the contents of the instance master object is generated using subroutine REWRITE as shown in step 76. Then, as shown in step 78, a direct response including the rewritten contents of the instance master object is prepared. Next, in all cases, the contents of the instance found on the primary server are transmitted to the web browser that requested it as shown in step 80. Finally, statistical information is recorded using subroutine POSTPROCESS and primary computer 28 stops execution as shown in steps 82 and 84.

Figure 3:
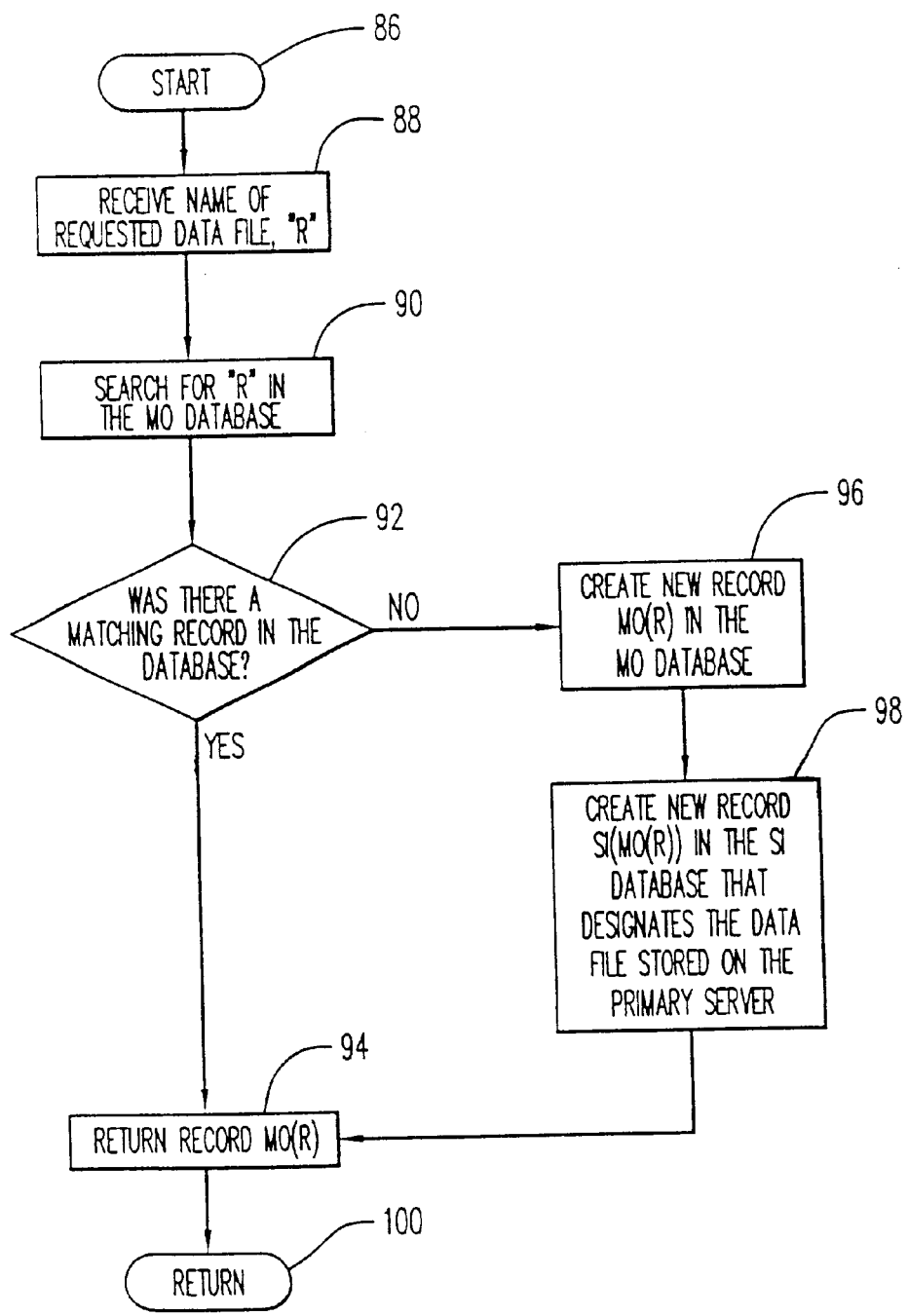
FIG. 3 is a flow diagram of the DEMAND MO subroutine of FIG. 2.

Referring to FIG. 3, the subroutine DEMAND-MO (step 64 of FIG. 2) begins at step 86 and responds to the request for the data file (40, 42) received by web server software 32 as shown in step 88. Primary computer 28 then searches the database for a master object record that matches the name given as shown in step 90. If there is a matching master object record in the database, then the coordinating means returns the master object record as shown in steps 92 and 94. If a matching record is not in the database, a new master object record with the name of the given file is created in the database as shown in step 96. Next, a new statistics record is created for this master object, and an instance record with the name of the given file is created in the instance database as shown in step 98. Also, the instance record is marked as primary and local and the instance is associated with primary web server 14. Finally, as shown in step 94, the new master object record is returned and, as shown in step 100, subroutine DEMAND MO returns to the main process of FIG. 2.

Figure 4:
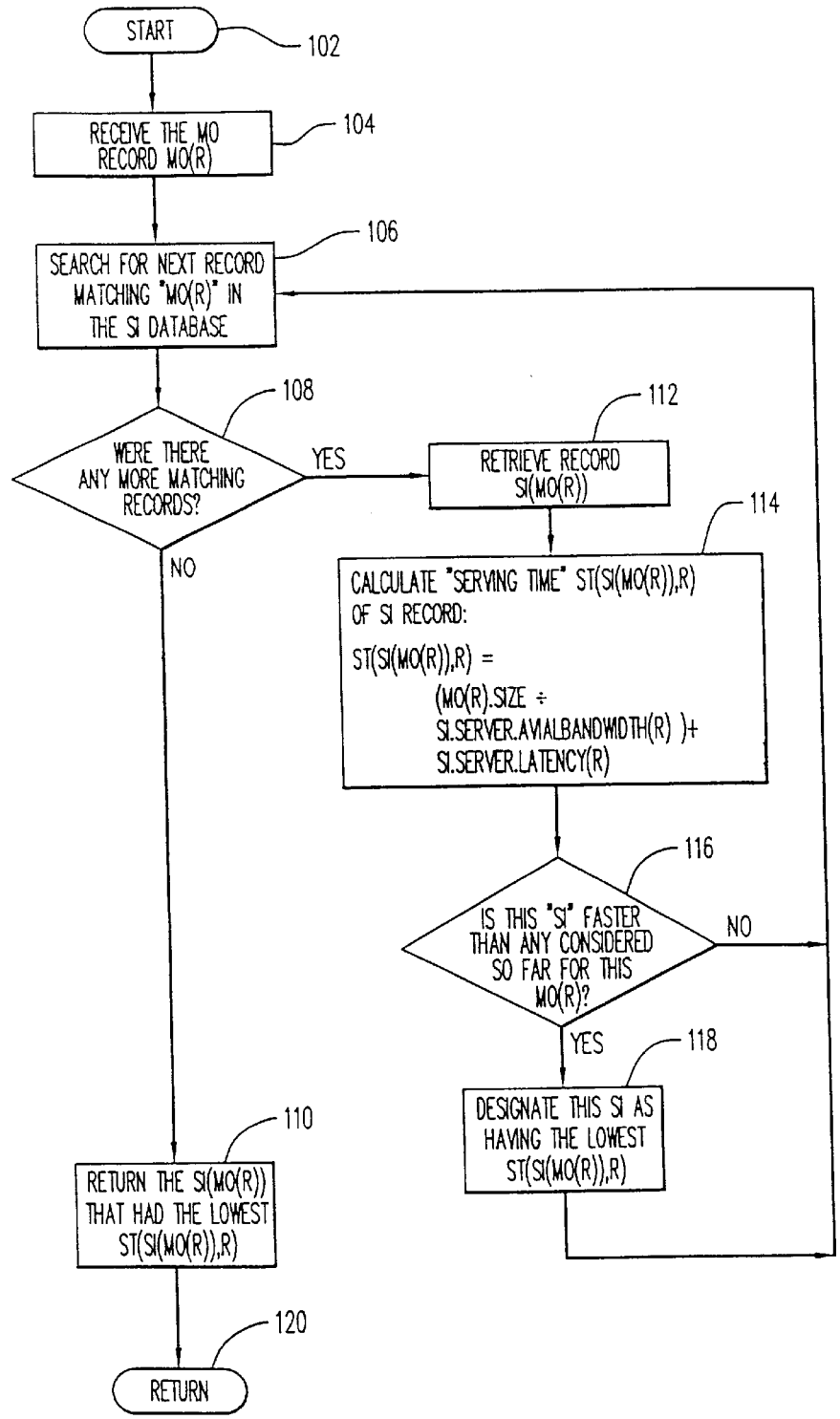
FIG. 4 is a flow diagram of the BEST SI subroutine of FIG. 2.

Referring to FIG. 4, there is provided the BEST SI subroutine shown as step 66 in FIG. 2, starting with step 102. Primary computer 28 initially receives a given master object and retrieves the list of instances associated with the given master object from the database as shown in steps 104 and 106. As shown in steps 108, primary computer 28 determines whether there are any more matching records. If no more matching records exist then the primary computer 28 returns the instance master object having the lowest serving time and/or highest quality score, and the BEST SI subroutine returns to the main process of FIG. 2 as shown in steps 110 and 120.

If there are any more matching records, such record is retrieved as shown in step 112. Then, the serving time is calculated by considering the transmission time of the data file from the given instance, given the current load on the server for the instance and the load and maximum speed of the communications link (38, 54) for that server (14, 16). The quality score is set to be an inverse function of the time required, and scaled by the topological distance between the web browser computer system 12 making the request and the server (14, 16) for this instance. Cost, latency and efficiency are also considered part of the quality score. If the serving time is faster than any other serving time considered so far for this master object, then the instance is designated as having the lowest serving time, and primary computer 28 searches for the next record matching the master object in the database as shown in steps 116 and 118. Otherwise, if the serving time is not the fastest one considered, then primary computer 28 simply goes back to searching for the next record matching the master object in the database as shown in steps 116.

Figure 5:
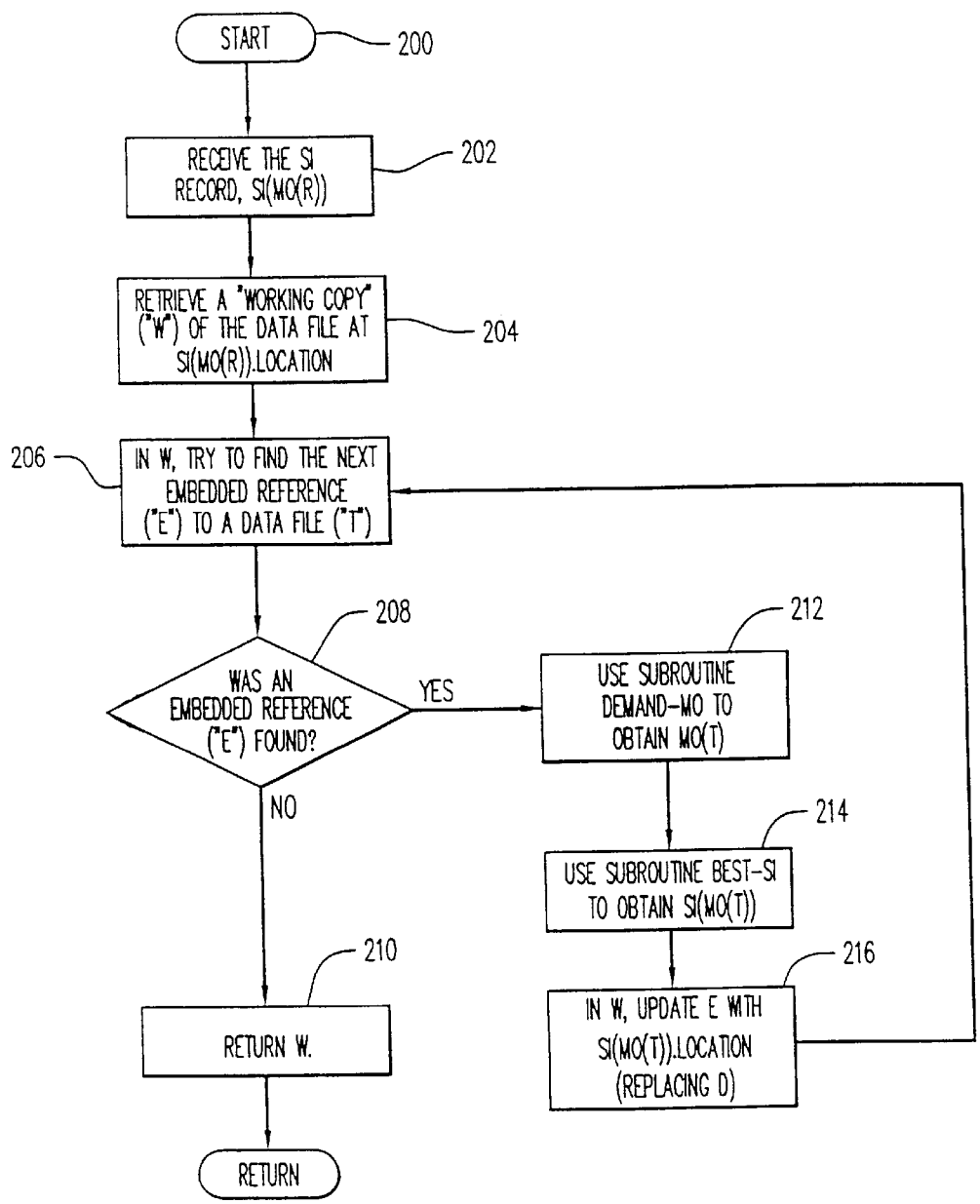
FIG. 5 is a flow diagram of the REWRITE subroutine of FIG. 2.

Referring to FIG. 5, there is provided the REWRITE subroutine shown as step 76 in FIG. 2, starting with step 200. Initially, the instance record is received, and a working copy of the data file of the instance record location is retrieved, as shown in steps 202 and 204. Primary computer 28 then analyzes the working copy of the data file for the next embedded reference to a data file as shown in step 206. Primary computer 28 determines whether an embedded reference was found in step 208. If not, the working copy is returned without any modifications as shown in step 210. If an embedded reference is discovered, the DEMAND MO subroutine is used to find the master object record for the embedded data file as shown in step 212. Next, the BEST SI subroutine is used to find the best instance for that master object as shown in step 214. Then, in the working copy of the data file, the reference to the original Web Server (i.e., an address code) and Data File names are replaced with the names of the web server and data file where the best instance is located a shown in step 216. If there is more in the data file to read, then primary computer 28 will try to read the next embedded reference to a data file. Finally, the primary computer 28 transmits the contents of working file to the web browser that requested it as shown in step 210.

Referring to FIG. 6, there is provided a preferred embodiment of the REWRITE subroutine shown as step 76 in FIG. 2, starting with step 122. Initially, the instance record is received, and the output file is initialized so that it is empty as shown in steps 124 and 126. The next segment of text is then read from the data file as shown in step 128. Then in step 130, primary computer 28 determines whether any data was read from the file. If not, the contents of the output file are returned as shown in step 132. However, if data was read from the file, then all non-tag text is copied to the page output buffer a shown in step 134. When a tag is encountered, primary computer 28 tries to read the next tag-only segment of the incident master object from storage as shown in step 136. Next, as shown in step 138, the primary computer 28 determines whether data was read from the file. If not, then the contents of the output file are returned as shown in step 132. As shown in steps 138 and 140, if data was read from the file, the primary computer 28 determines whether there is a reference to another data file. If none is found, the tag is copied to the output file without modification as shown in step 142. However, if the tag could contain such references, the DEMAND MO subroutine is used to find the master object record for the name found as shown in step 144. Next, the BEST SI subroutine is used to find the best instance for that master object as shown in step 146. Then, in the tag, the reference to the original Web Server and Data File names are replaced with the names of the web server and data file where the best instance is located a shown in step 148. The tag is then appended to the page output buffer as shown in step 150. If there is more in the data file to read, then primary computer 28 will try to read the next non-tag segment. Finally, the primary computer 28 transmits the contents of the page output buffer to the web browser that requested it as shown in step 132.

Referring to FIG. 7, there is provided the POSTPROCESS subroutine shown as step 82 in FIG. 2, starting with step 154. Primary computer 28 updates the statistical database records for the instance, the master object, the server, and the communications links appropriate to the instance that was selected as shown in step 156. Then, the first replication server is obtained as shown in step 158, and a determination is made as to whether there is a server to consider as shown in step 160. If not, then subroutine POSTPROCESS returns to the main process of FIG. 1. If a server to consider does exist, then a determination is made of whether there is already an instance of this master object on this server as shown in step 162. If so, the next replication server is considered as shown in step 158. If there is not an instance of the master object on the server, primary computer 28 determines whether the master object is larger than the total storage capacity of this server as shown in step 164. If so, the next replication server is considered a shown in step 158.

If the master object is not larger than the total storage capacity of the server, a list is made of the instances, if any, that would have to be deleted from this server in order to accommodate the master object under consideration as shown in step 166. The total replication value of the list and the replication value of the master object are computed as shown in steps 168 and 170. The total replication value of the list is compared to the replication value of the master object as shown in step 172. If the replication value of the given master object is not greater than the total replication value of the list, then the next replication server is examined as shown in step 158. If the replication value of the given master object is greater than the total replication value of the list, then the remote instances on the list are deleted. Specifically, elements of the list are deleted from the given server and from the instance database as shown in step 174, and a copy of the master object is made onto the given server and the record of instance master object is added to the instance database as shown in step 176. If all secondary webservers 16 are to be treated as one pooled storage area, then the POSTPROCESS subroutine returns to the main process of FIG. 2 as shown in step 178. If not, then more servers are examined as shown in step 158.

The present invention having been described with particular reference to the preferred forms thereof, it will be obvious that various changes and modifications may be made therein without departing from the spirit and scope of the invention as defined in the appended claims.

What is claimed is:

1. A method of serving data over a network comprising:

embedding, within a first data file on a primary server, a reference to a second data file;

maintaining copies of the second data file on multiple secondary servers on the network, each server having a distinct network address;

receiving at the primary server a request from a client computer for the first data file;

transmitting the first data file to the client computer;

selecting one of the multiple secondary servers using information in the first data file;

at the client computer, in response to receiving the first data file, automatically obtaining a copy of the second data file from the selected secondary server.

2. The method of claim 1, wherein the secondary server is selected after the request is received at the primary server.

3. The method of claim 2, wherein the secondary server is selected based on at least one of the group consisting of a transmission speed of the secondary server's communication link, a currently available capacity of the secondary server's communication link, and a topological proximity of the secondary server to the client computer.

4. A method of transmitting data to users over the internet, the method comprising:

maintaining copies of a set of data files on a plurality of servers, each server having a distinct internet network address;

maintaining, on at least one of the servers, specific server selection criteria pertaining to the data files based on variable efficiency parameters;

receiving at one of the servers a request from a user for the set of data files;

automatically allocating transmission of each individual data file in the set of data files to the user among the plurality of servers based on based on a real-time application of the specific server selection criteria; and automatically transmitting the individual data files comprising the requested set of data files to the user from the selected servers, respectively.

\* \* \* \* \*